Oct. 27, 1953
L. R. SPERBERG
2,657,117
TREATMENT FOR REDUCING THE pH OF FURNACE BLACKS
Filed Dec. 27, 1949
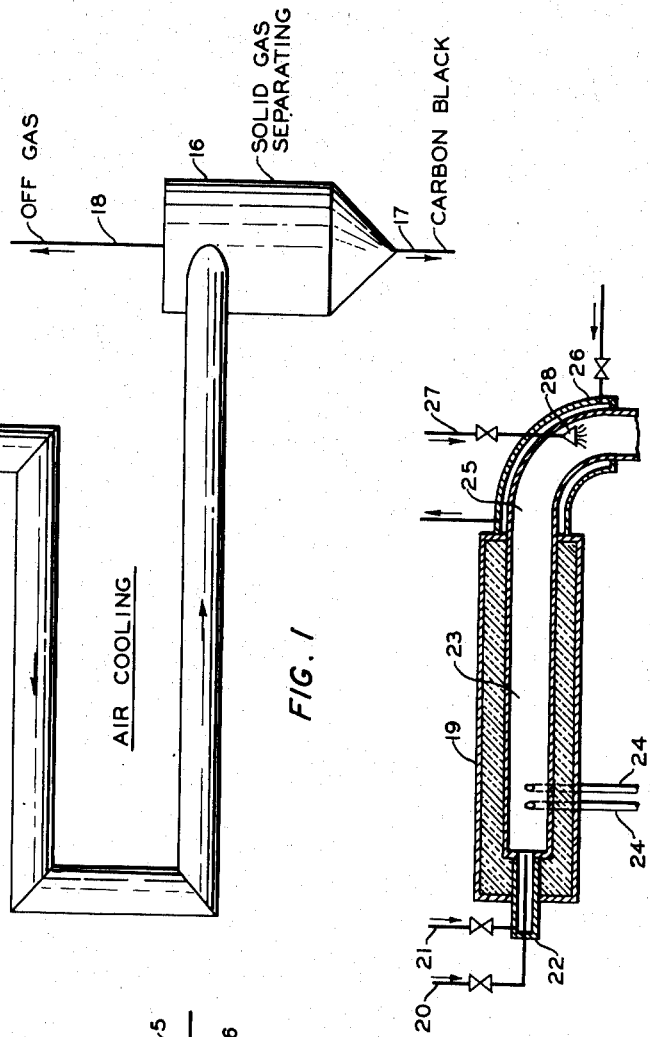
INVENTOR.
L.R. SPERBERG
BY Hudson & Young
ATTORNEYS Patented Oct. 27, 1953

2,657,117

UNITED STATES PATENT OFFICE 2,657,117

TREATMENT FOR REDUCING THE pH OF FURNACE BLACKS

Lawrence R. Sperberg, Bartlesville, Okla., assignor to Phillips Petroleum Company, a corporation of Delaware Application December 27, 1949, Serial No. 135,105

5 Claims. (Cl. 23—209.6)

This invention relates to a method for treating a furnace black. In one of its aspects, it relates to the method for reducing the pH of a furnace black. In another of its aspects, it relates to a method for increasing the scorch time of a furnace black when incorporated in natural and synthetic rubbers without materially affecting the curing rate or the ultimate physical properties of the vulcanizates. In still another of its aspects, it relates to the method for quenching the effluent products from a furnace producing furnace black.

When carbon black first became important in the compounding of rubber, the major portion of the total carbon black produced was manufactured by the so-called "channel" process wherein a natural gas was burned in a deficiency of oxygen and the resultant flame was caused to impinge upon a cool surface to deposit the carbon formed thereupon. Channel blacks produced by this and other similar processes are characterized by low pH's and long scorch times and are well suited for compounding in rubber. However, the methods of producing channel black are undesirably inefficient and require extensive equipment.

Within comparatively recent times, there has come into prominence and wide spread usage a process for making carbon black which permits the use of gas and/or liquid hydrocarbon feed and by which it is possible to produce large quantities of carbon black at high yields. This new type of carbon black is generally designated as a "furnace" black and while its properties are superior to channel blacks for some uses, they are inferior for certain other uses. For example, the scorch time of ordinary furnace black, when incorporated into rubber, is quite short and, accordingly, insufficient time is provided for complete milling of the rubber being compounded before vulcanization begins.

Furnace blacks are defined as carbon blacks produced by thermal decomposition and reforming and/or partial combustion of hydrocarbons in a reducing atmosphere of furnace gases containing carbon oxides and hydrogen as contrasted to channel blacks which are subjected to an oxidizing atmosphere while still at a relatively high temperature. Furnace blacks are usually characterized by an alkaline pH, greater than 7, while channel blacks have an acid pH usually less than 6.

It has now been found that the pH of a furnace black can be reduced to a point within the acid range and that the scorch time can be lengthened, without deleteriously affecting other desirable properties by treating the furnace black with an inorganic acid, said acid having a higher dipole moment than the dipole moments possessed by hydrogen, carbon monoxide, carbon dioxide, and nitrogen in order to insure a preferential adsorption of said acid, while the black is in a heated and nascent state, preferably immediately succeeding its formation in a furnace. Said acid definition as to higher dipole eliminates from use in this invention carbonic acid, if carbonic acid is otherwise considered a true inorganic acid. It is noted carbonic acid is sometimes listed as organic, sometimes as inorganic, and sometimes as both, by the usual chemical textbooks and handbooks. Thus, it has been found that an inorganic acid can be incorporated into the primary quench which is introduced into the flue gas-furnace black stream emerging from a furnace so that the acidic constituents of the quench will be adsorbed by the furnace black particles while they are still at an elevated temperature. The inorganic acid can also be injected into the flue gas-furnace black stream subsequent to the primary quench. When treated in this manner, the furnace black particles are contacted by the inorganic acidic constituent at a time when the particles have a maximum surface activity and, accordingly, when the desirable acidic constituents can be most strongly adsorbed by the particles. As a general rule, the adsorptive capacity and the strength of the adsorptive bond of a furnace black particle decreases with time and with a decrease in temperature after the particle has first been formed in the furnace. When a furnace black particle is cooled in the absence of the acidic components of this invention other materials, such as the hydrogen, carbon oxides, nitrogen, etc. found in the flue gas accompanying the furnace black particles from the furnace will be adsorbed and will tend to at least partially saturate the adsorptive capacity of the particle so that a subsequent treatment of the particles with an acidic compound will result in only a loose adsorption of the acidic compound. In accordance with this invention, the acid compound which is to be adsorbed by the furnace black particles, is contacted with those particles while they are in a nascent condition and at an elevated temperature and before any undesirable materials such as carbon oxides, nitrogen, hydrogen have been adsorbed by the particles. In this manner, the desired acidic compound is strongly adsorbed by the furnace black particles before any undesirable materials can be adsorbed by the furnace black particles. The adsorbed acidic compound will remain adsorbed, even upon cooling and further treatment of the furnace black particles.

According to this invention, there is provided a process for treating a furnace black. Still according to this invention, there is provided a process for reducing the pH and increasing the scorch time of a furnace black without deleteriously affecting other properties of the black which comprises treating a furnace black with an inorganic acid, said acid having a higher dipole moment than the dipole moments possessed by hydrogen, carbon monoxide, carbon dioxide, and nitrogen in order to insure a preferential adsorption of said acid, immediately after said carbon black has been formed and before it has adsorbed any other undesirable materials. Still further according to this invention, there is provided a process for treating a furnace black which comprises quenching the furnace black with an acidic medium as it emerges from the furnace wherein it is formed. Still yet according to this invention, there is provided a process for producing a furnace black having a pH in acidic range and having a satisfactory scorching time when incorporated into rubber which comprises forming a furnace black in a suitable furnace, quenching the resulting effluent with an acidic medium, and then recovering the furnace black product.

Although it is apparent that one skilled in the art could, upon reading the foregoing and without more, practice the process of this invention, a detailed description of a preferred embodiment of the invention will now be set forth in order to even more fully describe the invention.

The attached drawings illustrate preferred embodiments of the process of this invention. Figure 1 represents diagrammatically a process for the manufacture of a furnace black embodying the concept of this invention. Figure 2 is a cross-sectional view of the furnace employed in Figure 1. Figure 3 represents another embodiment of this invention employing a furnace differing from that of Figure 1.

In Figure 1, a hydrocarbon oil, such as gas oil, etc. is introduced via line 1 into combustion zone 2 in furnace 3. An oxygen-containing medium, such as air, is likewise introduced through line 4 into combustion zone 2 wherein it is intimately admixed with the oil introduced through line 1. Additional hydrocarbon oil and/or gas is introduced through line 5 and is admixed with air introduced through line 6 before passing to combustion zone 2 via line 7. Line 7 is situated tangentially to the walls of combustion zone 2, as shown in Figure 2, so that the materials introduced through line 7 will induce a rotary motion of the materials present in combustion zone 2. In combustion zone 2, the hydrocarbons present therein begin their reaction which, upon completion in reaction zone 8, will result in the production of the desired furnace black. The partially reacted hydrocarbons from combustion zone 2 pass into and through reaction zone 8 which has a diameter smaller than that of combustion zone 2. In reaction zone 8, the completion of the furnace black formation reaction is secured. A more complete description of furnace 3 and the reactions occurring therein is set forth in a copending application, Serial No. 743,893, filed April 25, 1947, by Joseph C. Krejci.

The furnace black particles which have been formed in furnace 3 emerge therefrom and enter conduit 9, which can be substantially the same diameter as reaction zone 8 of furnace 3. Conduit 9 is surrounded by a cooling jacket 10 which is supplied with a coolant, such as water, through line 11. The heated coolant leaves jacket 10 via line 12 and can be recirculated after intermediate cooling back to the line 11. A primary quenching medium comprising an aqueous solution of an inorganic acid, said acid having a higher dipole moment than the dipole moments possessed by hydrogen, carbon monoxide, carbon dioxide, and nitrogen in order to insure a preferential adsorption of said acid, is introduced via line 13 into conduit 9, as shown in Figure 1.

The furnace black emerging from furnace 3 is suspended in a stream of combustion products and will usually be at a temperature between 2200 and 2600° F. Sufficient cooling is provided by the primary quenching medium introduced via line 13 and by cooling jacket 10 to cool the suspension of furnace black to a temperature of about 1000° F. as it emerges from the jacketed conduit 9. It is usually desirable to further cool the suspension of furnace black before any separation is made therebetween. Accordingly, there can be provided an air cooling system comprising an uninsulated conduit 14 through which the suspension of furnace black passes. If desirable, an inorganic acid treating medium can be introduced through line 15 into conduit 14 to supplement the inorganic acid constituent of the primary quenching medium in line 13. The treating medium introduced through line 15 can be more concentrated than the acidic quenching medium introduced into conduit 9 through line 13. Thus, if desired, the treating medium in line 15 can be a concentrated form of inorganic acid, said acid having a higher dipole moment than the dipole moments possessed by hydrogen, carbon monoxide, carbon dioxide, and nitrogen in order to insure a preferential adsorption of said acid, and since its primary function is to introduce an inorganic acid into conduit 14, its concentration will not depend upon the amount of water required for quenching as is the case with the primary quenching medium in line 13.

The cooled suspension of furnace black emerges from conduit 14 at a temperature in the range of about 300 to 500° F. and enters a solid-gas separating means 16 wherein the furnace black is separated from the accompanying suspending agent, i. e. the combustion products from furnace 3. Solid-gas separator means 16 can be comprised of any apparatus suitably adapted to separate solid particles such as furnace black, from a relatively hot suspending gas. Among such means may be mentioned bag filters, cyclone separators, electrostatic precipitators, and combinations thereof. The separated furnace black is removed via line 17 and passed to other portions of the furnace black manufacturing process (not shown) such as pelleting operations, bagging operations, etc. The separated gas is removed via line 18.

In Figure 3 there is shown that portion of the process illustrated in Figure 1 which pertains to the furnace and the primary quenching system. Furnace 19 of Figure 3 differs in structure from furnace 3 of Figure 1 primarily in the design of the reaction zone as shown. The furnace illustrated in Figure 3 is more fully described in copending application Serial No. 577,180, filed February 10, 1945, by Joseph C. Krejci, now abandoned.

A hydrocarbon oil is introduced through line 20 into furnace 19. An oxygen-containing medium, such as air, is introduced through line 21 and conduit 22. The hydrocarbon oil and air are intimately admixed in reaction zone 23 wherein the hydrocarbon oil is converted to furnace black. A mixture of fuel gas and air or air alone can be introduced through lines 24 into reaction zone 23 at a point intermediate the ends thereof. Lines 24 are located in furnace 19 in such fashion that the materials introduced therethrough enter the furnace tangentially to the circumference of reaction zone 23 to thereby induce the materials flowing therethrough to move in a helical path. The furnace black formed in reaction zone 23 emerges from furnace 19 as a gaseous suspension in combustion products and enters conduit 25. Cooling jacket 26 surrounds conduit 25 and permits cooling of the products flowing therethrough. A primary quenching medium comprising an aqueous solution of an inorganic acid, said acid having a higher dipole moment than the dipole moments possessed by hydrogen, carbon monoxide, carbon dioxide, and nitrogen in order to insure a preferential adsorption of said acid, is introduced via line 27 and spray head 28 to assist in the cooling of the furnace black suspension. The partially cooled furnace black emerges from conduit 25 and passes to an air cooling system into which additional inorganic acid, said acid having a higher dipole moment than the dipole moments possessed by hydrogen, carbon monoxide, carbon dioxide, and nitrogen in order to insure a preferential adsorption of said acid, can be injected if desired. The suspension can then be separated in a fashion similar to that described in connection with Figure 1.

As in Figure 1, the suspension of furnace black emerging from reaction zone 23 is at a temperature of about 2200 to 2600° F. and is cooled in jacketed conduit 25, primarily by means of quenching medium from line 27, to a temperature of about 1000° F.

Thus, in accordance with this invention, a newly formed furnace black is treated with an inorganic acid, said acid having a higher dipole moment than the dipole moments possessed by hydrogen, carbon monoxide, carbon dioxide, and nitrogen in order to insure a preferential adsorption of said acid, while the said furnace black is at a temperature between about 2600 and 300° F., preferably between about 2600 and 500° F., and before the furnace black has adsorped appreciable amounts of other materials such as nitrogen, hydrogen, carbon oxides, etc. As a feature of this invention, a newly formed furnace black is treated with such an inorganic acid such as hydrochloric while the furnace black is at a temperature between 2600 and 300° F., preferably between 2600 and 500° F. As an additional feature, the newly formed furnace black is treated with an inorganic acid, said acid having a higher dipole moment than the dipole moments possessed by hydrogen, carbon monoxide, carbon dioxide, and nitrogen in order to insure a preferential adsorption of said acid, as just stated and, in addition, is further treated with an inorganic acid such as sulfuric, sulfurous or nitric while at a temperature between 1000 and 300° F., preferably between 900 and 500° F.

In a preferred embodiment of this invention, an acid such as hydrochloric acid is admixed with an aqueous quenching medium which is employed to cool the furnace black suspension emerging from the furnace black furnace. In such a preferred embodiment, the primary quenching medium comprises an aqueous solution of an inorganic acid such as hydrochloric acid. Such a solution will contact the furnace black while it is at a temperature between 2600 and 300° F., preferably between 2600 and 500° F.

In a still more preferable embodiment of this invention, an acid, said acid having a higher dipole moment than the dipole moments possessed by hydrogen, carbon monoxide, carbon dioxide, and nitrogen in order to insure a preferential adsorption of said acid, is injected with the primary quenching medium and then an inorganic acid, said acid having a higher dipole moment than the dipole moments possessed by hydrogen, carbon monoxide, carbon dioxide, and nitrogen in order to insure a preferential adsorption of said acid, such as sulfuric ($H_2SO_4$), sulfurous ($H_2SO_3$) or nitric ($HNO_3$) is injected into the flue gas-carbon black suspension after it has been quenched but before it reaches the flue gas-carbon black separator. Hence, in this most preferable embodiment, an inorganic acid, said acid having a higher dipole moment than the dipole moments possessed by hydrogen, carbon monoxide, carbon dioxide, and nitrogen in order to insure a preferential adsorption of said acid, is injected as a part of an aqueous quenching medium and contacts the furnace black while it is at a temperature between 2600 and 300° F., preferably between 2600 and 500° F. and the same, or another, inorganic acid, said acid having a higher dipole moment than the dipole moments possessed by hydrogen, carbon monoxide, carbon dioxide, and nitrogen in order to insure a preferential adsorption of said acid, contacts the furnace black at a temperature between 1000 and 300° F., preferably between 900 and 500° F. In this manner, said acids contact the furnace carbon black while it is at a temperature between 1000 and 300° F., preferably between 900 and 500° F. As a general rule, it is preferred that the inorganic acid employed have a higher dipole moment than the dipole moments possessed by the materials admixed with the furnace black suspension, such as hydrogen, carbon monoxide, carbon dioxide, and nitrogen in order to ensure a preferential adsorption of the acid. Among the acids which can be employed are hydrochloric ($HCl$), sulfuric ($H_2SO_4$), sulfurous ($H_2SO_3$), nitric ($HNO_3$), and other similar inorganic acids or admixtures thereof. As stated, it is preferred to employ aqueous hydrochloric acid when the furnace black is at a temperature above 1000° F. and to employ sulfuric, sulfurous or nitric acids when the furnace black is at a temperature below 1000° F. A concentration of uncombined acid in the primary quenching medium within the range of about 0.05 to about 1.0, preferably from about 0.10 to about 0.60, weight per cent of the quenching medium has been found satisfactory. Or, expressed in another manner, the amount of acid employed can be sufficient to supply a partial pressure of injected acidic material in the flue gas-carbon black stream between 1 and 200, preferably between 5 and 50 mm. of mercury. The amount of inorganic secondary treatment acid injected to supplement the injected primary quench acid can be sufficient to supply a partial pressure of oxidizing acidic material between 1 and 200, preferably between 5 and 25 mm. of mercury. The exact amount of acid which is to be admixed with the quenching medium will depend upon the individual characteristics of the furnace black being manufactured, its concentration in the flue gases, the temperature of the furnace black suspension, the total volume of quenching medium employed, the period of contact of the quenching medium with the suspension of furnace black and upon other factors. It is obvious that the exact amount of acid employed will depend largely upon the individual furnace black being treated and enough acid should be employed to obtain a final furnace black product having the desired pH as well as the desired increase in scorching time and such amount can be determined by mere routine test for any individual set of operating conditions.

The furnace black product manufactured according to the process of this invention has, as stated, a pH within the acid range. In ordinary treatments of a furnace black with an acid compound after the furnace black has been quenched, the acidic compound will be loosely adsorbed and will gradually be desorbed upon standing for a comparatively short time after which the pH of the furnace black will again be within the basic range. However, furnace black manufactured according to the process of this invention retains its acidic pH over long periods of time because the acidic compound is strongly adsorbed thereon. Thus, it is apparent that furnace black having a pH within the acid range can be manufactured according to the process of this invention and then shipped and/or stored without losing the adsorbed acidic compounds.

The term "furnace black" is employed herein to denote a carbon black produced by thermal decomposition and reforming and/or partial combustion of hydrocarbons in a reducing atmosphere and which is adapted to be incorporated as a structural black in a natural or a synthetic rubber.

While the invention has been described with a present, preferred embodiment thereof, it is to be understood that this description is illustrative only and is not intended to limit the invention, the scope of which is defined by the appended claims.

I claim:
1. In a process for manufacturing a furnace black wherein a hydrocarbon is reacted in a reaction zone having a reducing atmosphere therein to produce said furnace black, the method of reducing the pH and of increasing the scorch time of said furnace black which comprises quenching said furnace black immediately after its formation from an elevated temperature to a less elevated temperature with a liquid quenching medium containing an inorganic acid selected from the group consisting of hydrochloric, sulfuric, sulfurous and nitric acids in an amount sufficient to supply an atmosphere having a partial pressure of acidic material between 1 and 200 mm. of mercury.

2. In a process for manufacturing a furnace black wherein a hydrocarbon is reacted in a reaction zone having a reducing atmosphere therein to produce said furnace black, the method of reducing the pH and of increasing the scorch time of said furnace black which comprises quenching said furnace black immediately after its formation from a temperature of from 2200° to 2600° F. to a lower temperature with an aqueous liquid quenching medium containing an inorganic acid selected from the group consisting of hydrochloric, sulfuric, sulfurous and nitric acids in an amount sufficient to supply an atmosphere having a partial pressure of acidic material between 1 and 200 mm. of mercury.

3. The process of claim 2 wherein the said inorganic acid is hydrochloric acid.

4. In a process for manufacturing a furnace black wherein a hydrocarbon is reacted in a reaction zone having a reducing atmosphere therein to produce said furnace black, the method of reducing the pH and of increasing the scorch time of said furnace black which comprises quenching said furnace black immediately after its formation from a temperature of from 2200° to 2600° F. to a temperature of about 1000° F. with an aqueous liquid quenching medium containing an inorganic acid selected from the group consisting of hydrochloric, sulfuric, sulfurous and nitric acids in an amount sufficient to supply an atmosphere having a partial pressure of non-oxidizing material between 1 and 200 mm. of mercury and then treating the thus quenched furnace black while at a temperature between 1000 and 300° F. with an inorganic acid treating agent selected from the group consisting of hydrochloric, sulfuric, sulfurous and nitric acids in an amount sufficient to supply an atmosphere having a partial pressure of oxidizing acidic material between 1 and 200 mm. of mercury.

5. The method of claim 4 wherein the acid in said aqueous liquid quenching medium is hydrochloric acid and the inorganic treating agent is nitric acid.

LAWRENCE R. SPERBERG.

References Cited in the file of this patent

UNITED STATES PATENTS

| Number | Name | Date |
| --- | --- | --- |
| 1,891,859 | Winter | Dec. 20, 1932 |
| 1,999,541 | Keller | Apr. 30, 1932 |
| 2,013,774 | Wiegand | Sept. 10, 1935 |
| 2,144,971 | Heller | Jan. 24, 1939 |
| 2,210,763 | King | Aug. 6, 1940 |
| 2,368,828 | Hanson et al. | Feb. 6, 1945 |
| 2,408,696 | Smallwood | Oct. 1, 1946 |
| 2,420,810 | Bray et al. | May 20, 1947 |
| 2,439,442 | Amon et al. | Apr. 13, 1948 |

OTHER REFERENCES

Getman and Daniels, "Outline of Physical Chemistry," 7th ed., page 81. Published by John Wiley and Sons, Inc. Copyright 1943.

Braendle et al., "India Rubber World," vol. 119, No. 1, pages 57–62, New York, October 1948.

Huckel, "Structural Chemistry of Inorganic Chemistry," vol. I, pages 344–347. Published by Elsevier Publ. Co., Inc., New York, 1950.